Patented Jan. 5, 1937

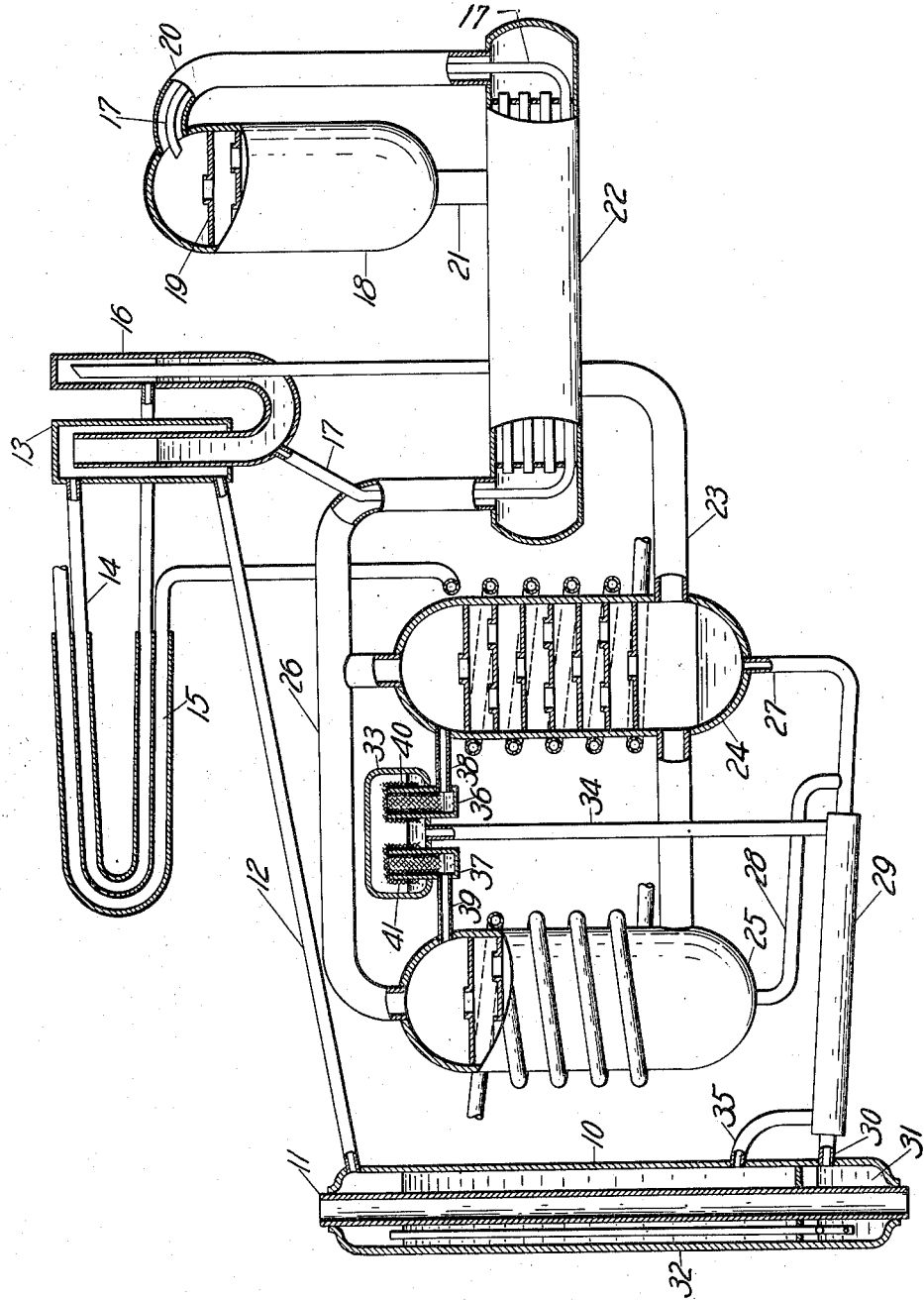

2,066,660

UNITED STATES PATENT OFFICE 2,066,660

REFRIGERATION

Albert R. Thomas, Evansville, Ind., assignor, by mesne assignments, to Servel, Inc., Dover, Del., a corporation of Delaware Application November 12, 1932, Serial No. 642,333
Renewed November 23, 1934

19 Claims. (Cl. 62—119.5)

My invention relates to circulation of liquid in refrigerating systems.

It is often desirable to distribute liquid from one body in a number of substantially equal quantities or divide a stream of liquid into substantially equal parts as, for instance, in an absorption refrigerating system provided with a single generator and a plurality of absorbers in which it is necessary to divide the weak absorption liquid from the generator between the absorbers. Such a refrigerating system is disclosed in United States Letters Patent Number 1,908,901 to Donald B. Knight. As set forth in that application, the requirements of height, capacity, and efficiency in an absorption refrigerating apparatus may be advantageously complied with by providing a plurality of small absorbers rather than a single large absorber, in which case it becomes necessary to distribute weak absorption liquid from the generator. I accomplish this by means which is simple, effective, and economical.

In accordance with my invention there are provided a plurality of substantially identical capillary syphons, such as wicks, arranged to direct overflow of liquid from one body into a plurality of channels. It will be obvious that if it is desired to divide the liquid in unequal proportions correspondingly dissimilar capillary syphons may be employed.

Other objects and advantages of my invention will be apparent from the following description taken in connection with the accompanying drawing in which the figure shows schematically an absorption refrigerating system of the pressure equalized type provided with two absorbers and a device contemplated by my invention for substantially equal distribution of the weak absorption liquid.

Referring to the drawing, the refrigerating system is generally of the type shown and explained in Patent No. 1,609,334 to von Platen et al, and provided with two absorbers as disclosed in Patent No. 1,908,901, referred to above. Briefly, a generator 10 containing a solution of refrigerant in an absorption liquid, such as ammonia in water, is adapted to be heated by some means such as a burner, not shown, in a heating flue 11 which extends upwardly through the generator. Ammonia vapor expelled from solution by heat in the generator passes through conduit 12 and rectifier 13 to the condenser 14 where the ammonia is cooled by heat transfer to water circulating through pipe 15 and condensed to liquid which accumulates in the U-tube 16. From the latter, liquid ammonia flows through conduit 17 into the upper part of evaporator 18 where it flows downwardly over baffle plates 19, evaporating by diffusion into hydrogen which enters the evaporator through conduit 20. The resulting gas mixture, commonly referred to as rich gas, flows from the evaporator through conduit 21, gas heat exchanger 22, and conduit 23 to the absorbers 24 and 25.

In the absorbers, the ammonia is absorbed out of the rich gas by weak absorption liquid which is supplied to the absorbers as hereinafter described. The hydrogen or weak gas from which ammonia has been absorbed returns through conduit 26, gas heat exchangers 22, and conduit 20 to the evaporator. Enriched absorption liquid accumulates in the lower part of the absorbers 24 and 25 from where it flows through conduits 27 and 28 respectively, liquid heat exchanger 29, and conduit 30 to the pump chamber 31 which is heated by the generator heating means and from where the liquid is raised through a pipe 32 back into the generator by thermosyphonic action as well known in the art.

A liquid distributor contemplated by my invention comprises a vessel 33 connected through conduit 34, liquid heat exchanger 29 and conduit 35 to the lower part of the generator whereby weak absorption liquid stands in the vessel 33 at substantially the same surface level as in the generator. Cups or receptacles 36 and 37 extend upwardly within the vessel 33 forming two chambers separated from the liquid in said vessel and extending downwardly below the level of liquid in the vessel. The lower parts of the receptacles 36 and 37 are connected through conduits 38 and 39 to the upper parts of the absorbers 24 and 25 respectively. Over the upper edges of the cups are looped substantially identical wicks 40 and 41 each with one end extending into the liquid in vessel 33 and the other end depending below the liquid level into said cups or receptacles.

Weak absorption liquid pocketed in the vessel 33 is divided at the surface level of liquid therein by capillarity and delivered in substantially equal quantities by overflow through wicks 40 and 41 into the receptacles 36 and 37 respectively from where the liquid flows through conduits 38 and 39 into the absorbers 24 and 25 respectively, flowing downwardly over the baffle or liquid spreading plates, absorbing ammonia vapor out of the rich gas, as previously described.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. In an absorption type refrigerating system having two absorbers, means for maintaining a quantity of absorption liquid above said absorbers, and two substantially identical capillary syphon elements for distributing absorption liquid in equal amounts from said quantity to said absorbers.

2. In an absorption type refrigerating system having a plurality of absorbers, means for maintaining a quantity of absorption liquid above said absorbers, and a plurality of capillary syphon elements for distributing absorption liquid from said quantity to said absorbers.

3. In an absorption type refrigerating system having a plurality of absorbers, means for maintaining a quantity of absorption liquid above said absorbers, and a plurality of wicks for distributing absorption liquid from said quantity to said absorbers.

4. In an absorption type refrigerating system having two absorbers, a vessel, means for maintaining absorption liquid in the lower part of said vessel, a conduit extending downwardly from said chamber above the liquid level therein to each absorber, and a capillary syphon element extending from the lower part of said vessel into each conduit.

5. In an absorption type refrigerating system having a plurality of absorbers, a vessel, means for maintaining absorption liquid in the lower part of said vessel, a plurality of conduits extending downwardly from said vessel above the liquid level therein to said absorbers, and a plurality of substantially identical capillary syphon elements extending from the lower part of said vessel into said conduits.

6. In an absorption type refrigerating system having a plurality of absorbers, a vessel, means for maintaining absorption liquid in the lower part of said vessel, a plurality of conduits extending downwardly from said vessel above the liquid level therein to said absorbers, and a plurality of substantially identical wicks extending from the lower part of said vessel into said conduits.

7. In an absorption type refrigerating system having a generator and a plurality of absorbers, a vessel connected to receive weak absorption liquid from said generator, and a plurality of capillary syphon elements for distributing weak absorption liquid from said vessel to said absorbers.

8. In an absorption type refrigerating system having a generator and a plurality of absorbers, means including a plurality of capillary syphon elements for distributing weak absorption liquid from said generator to said absorbers.

9. In an absorption type refrigerating system having a generator and a plurailty of absorbers, a vessel connected to receive weak absorption liquid from said generator, a conduit from each of said absorbers extending upwardly into said vessel above the liquid level therein, and a plurality of substantially identical wicks extending from the liquid in said vessel into said conduits.

10. In an absorption refrigerating system of the pressure equalized type having a generator and a plurality of absorbers, means for circulating absorption liquid between said generator and absorbers including, a vessel connected to contain weak absorption liquid at the same level as in the generator, conduits extending downwardly from said vessel above the liquid level therein to said absorbers, and a pluraltiy of wicks for transferring liquid from said vessel into said conduits.

11. In an absorption refrigerating system of the pressure equalized type having a generator and a plurality of similar absorbers, means for circulating absorption liquid between said generator and absorbers including, a vessel connected to contain weak absorption liquid at the same level as in the generator, a plurality of conduits extending downwardly from said vessel above the liquid level therein to said absorbers, a plurality of substantially identical wicks extending from the liquid in said vessel into said conduits for distributing equal quantities of liquid to said absorbers, and means for raising enriched absorption liquid from said absorbers into said generator.

12. In a method of refrigeration which includes expelling refrigerant vapor from solution in an absorption liquid, liquefying the expelled vapor, evaporating the liquid in the presence of an inert auxiliary gas, and conducting weakened absorption liquid into the presence of the auxiliary gas to cause absorption of refrigerant fluid out of the auxiliary gas, that improvement which consists in causing the weakened absorption liquid to become substantially equally divided at a surface level thereof in a plurality of separate paths of flow by substantially equal forces, each due to limitation of flow area and gravity.

13. Absorption type refrigeration apparatus including a generator, an evaporator, a plurality of absorbers, members forming a circuit for gas from said evaporator through said absorbers in parallel, and members forming a circuit for absorption liquid from said generator through said absorbers in parallel and constructed and arranged to cause flow of liquid from a low level to a high surface level by thermosiphon action and division of liquid at said high surface level into a plurality of separate paths of flow through said absorbers respectively.

14. A method of refrigeration which includes expelling refrigerant vapor from absorption liquid, liquefying the expelled vapor, evaporating the liquid, flowing the resulting vapor to a plurality of places of absorption, raising absorption liquid to a surface level above said places of absorption, and dividing the liquid at said surface level for gravity flow in parallel in the presence of vapor in said places of absorption.

15. An absorption refrigeration system including a generator in which refrigerant vapor is expelled from absorption liquid, a condenser for liquefying the expelled vapor, an evaporator in which the liquid is evaporated, a plurality of individually cooled places of absorption, members for flow of vapor from said evaporator through said places of absorption, means for raising absorption liquid to a surface level above said places of absorption, and means for dividing liquid at said surface level for gravity flow of the liquid in parallel in the presence of vapor in said places of absorption.

16. An absorption refrigeration system including a generator in which vapor is expelled from solution in an absorption liquid, means for liquefying the expelled vapor, means for evaporating the liquid to produce a refrigeration effect, a place of absorption, means for cooling said place of absorption, members for flow of vapor from said evaporation means through said place of absorption, means for raising absorption liquid to a level above said place of absorption, and a capillary siphon for conducting liquid from said level into a path of gravity flow leading into the presence of vapor in said place of absorption.

17. An absorption refrigeration system including a generator in which refrigerant vapor is expelled from solution in an absorption liquid, means for liquefying the expelled vapor, means for evaporating the liquid to produce a refrigeration effect, a place of absorption, means for cooling said place of absorption, members for flow of vapor from said evaporation means through said place of absorption, means for raising absorption liquid to a level above said place of absorption, and a wick having a loop above said level for conducting liquid from said level into a path of gravity flow leading into the presence of vapor in said place of absorption.

18. A method of refrigeration which includes expelling refrigerant vapor from absorption liquid, liquefying the expelled vapor, evaporating the liquid, flowing the resulting vapor to a plurality of places of absorption, forming a pocketed body of weakened absorption liquid having a surface level above said places of absorption, and dividing the liquid for gravity flow into the presence of vapor in said places of absorption by providing limited overflow from said pocketed body of liquid.

19. An absorption refrigeration system including a generator in which refrigerant vapor is expelled from absorption liquid, a condenser for liquefying the expelled vapor, an evaporator in which the liquid refrigerant is evaporated, means forming a plurality of places of absorption, members for flow of vapor from said evaporator to said places of absorption, means forming a pocket for liquid, means for conducting weakened absorption liquid to said pocket, means providing for limited overflow of liquid from said pocket forming means at a plurality of places, and means for conducting overflow liquid from each of said places to one of said places of absorption respectively.

ALBERT R. THOMAS.